PICTURE SIGNAL COMPENSATION BY CHANGE OF BEAM SIZE

Filed Feb. 1, 1955 4 Sheets-Sheet 1

INVENTORS
WALTER G. GIBSON
& ALFRED C. SCHROEDER
BY [signature]
ATTORNEY

Jan. 12, 1960 W. G. GIBSON ET AL 2,921,128

PICTURE SIGNAL COMPENSATION BY CHANGE OF BEAM SIZE

Filed Feb. 1, 1955 4 Sheets-Sheet 2

INVENTORS
WALTER G. GIBSON
& ALFRED C. SCHROEDER
BY [signature]
ATTORNEY

Jan. 12, 1960 W. G. GIBSON ET AL 2,921,128

PICTURE SIGNAL COMPENSATION BY CHANGE OF BEAM SIZE

Filed Feb. 1, 1955 4 Sheets-Sheet 3

INVENTORS
WALTER G. GIBSON
& ALFRED C. SCHROEDER
BY [signature]
ATTORNEY

Jan. 12, 1960 W. G. GIBSON ET AL 2,921,128

PICTURE SIGNAL COMPENSATION BY CHANGE OF BEAM SIZE

Filed Feb. 1, 1955 4 Sheets-Sheet 4

INVENTORS
WALTER G. GIBSON
& ALFRED C. SCHROEDER
BY
ATTORNEY

United States Patent Office 2,921,128

Patented Jan. 12, 1960

2,921,128

PICTURE SIGNAL COMPENSATION BY CHANGE OF BEAM SIZE

Walter G. Gibson, Princeton, N.J., and Alfred C. Schroeder, Huntingdon Valley, Pa., assignors to Radio Corporation of America, a corporation of Delaware Application February 1, 1955, Serial No. 485,510

8 Claims. (Cl. 178—7.2)

This invention relates to video signalling systems, and, more particularly to novel methods and apparatus for effecting the aperture compensation of image representative signals in such systems.

Revolution of a pictorial representation such as a television picture is, in part, a function of the effective apertures of the video signal generating and reproducing apparatus. In the types of such apparatus generally employed at present, the effective apertures of the pickup and reproducing devices are defined by the spot sizes of the respective electron beams used to scan the targets of these devices. It is desirable to make the effective aperture as small as practicable in order to convey a maximum of picture detail information.

Numerous systems using electrical filters have been designed and used to compensate for effective aperture loss in the direction of line scanning, which usually is the horizontal direction and shall be so considered for the purposes of the present description. However, the use of similar apparatus to compensate for effective aperture loss in a vertical direction has not heretofore been deemed practical. It has however been recognized that by suitably combining with information derived from the scanning of each pickup raster line, information derived from the scanning of vertically adjacent picture areas, e.g. the immediately preceding and the immediately succeeding scanning lines, aperture compensation in the vertical direction may be achieved.

A vertical aperture compensation system has been proposed in which information concerning the preceding and the succeeding lines may be derived during the scanning of a given line through the use of "spot wobble" in the vertical direction. Thus, the scanning beam of an image pickup device is wobbled in the vertical direction to traverse regions of the scanned target above and below as well as on a given line of the scanning raster during each line scanning interval. By suitable operations on the output signal of the wobble beam image pickup device the information derived from beam traversal of the adjacent regions may be effectively subtracted from the information derived from the scanning of each given line to a controllable degree to provide a corrected signal output, aperture compensated in the vertical direction.

The present invention is concerned with providing a system for simultaneously carrying out aperture compensation in both the vertical and horizontal directions, i.e. for effecting omnidirectional aperture compensation. In accordance with embodiments of the present invention, such omnidirectional aperture compensation is effected in a novel manner utilizing focus modulation of the scanning beam of an image pickup device, whereby during each line scanning interval the scanning beam cyclically alternates between conditions of sharp focus and defocus at the pickup device target. By operating on the signal derived from the scanning of the pickup device target with such a "focus wobbled" beam to effectively substract signal components derived by defocused spot scanning from signal components derived by focused spot scanning in accordance with the principles of the present invention, a corrected video signal is obtained which stands compensated for effective aperture loss in all directions.

It is thus an object of the present invention to provide a novel and improved picture signal compensation system.

It is a further object of the present invention to effect an improvement in the resolution of image reproductions in an image signalling system by providing novel means for compensating image representative signals for effective aperture loss.

An additional object of the present invention is to provide a novel system for generating video signals compensated for effective aperture loss in both vertical and horizontal directions.

Another object of the present invention is to provide a novel omnidirectional aperture compensation system.

Other objects and advantages of the present invention may be readily ascertained upon a reading of the following detailed description and an inspection of the accompanying drawings in which—

Figures 1, 2, and 3 comprise diagrams essentially in block form illustrating video signal generating apparatus in which provision is made for omnidirectional aperture compensation in accordance with various embodiments of the present invention.

Figure 1:
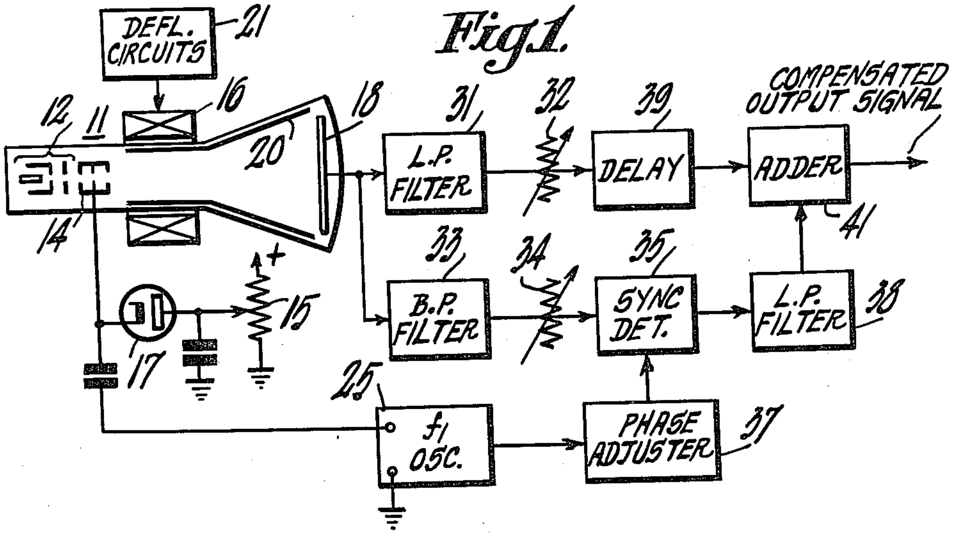

In Figure 1, utilization of an embodiment of the present invention in effecting the omnidirectional aperture compensation of signals generated by a conventional video signal generating device is illustrated. For purposes of example, the signal generating device 11 has been illustrated as one of the so-called monoscope type, a well-known type of pickup device generally used for producing a test signal from a static image which is printed on the signal plate within the tube. However, it should be recognized that the present invention is generally applicable to a variety of forms of image pickup devices, including such image scanning devices as the image orthicon, vidicon, iconoscope, flying spot scanner, etc. The monoscope 11, of the 2F21 type, for example, is illustrated as being provided with a conventional electron gun 12, electrostatic focus electrode 14, deflection yoke 16, beam target or "pattern electrode" 18, and secondary electron collector 20. It may be assumed that the deflection yoke 16 is energized with the usual scanning waves developed in deflection circuits 21 to cause the beam to trace a conventional interlaced scanning raster on the target 18.

In accordance with the principles of the invention, oscillations of a relatively high frequency $f_1$ (e.g. 10 mc.) developed by an oscillator 25 are applied to the focus electrode 14, in addition to the usual D.-C. focus voltage derived from a suitable voltage source (not shown) via potentiometer 15. It may be assumed a clamping diode 17 is provided in the connection of the potentiometer 15 tap to focus electrode 14 to insure that the oscillatory voltage wave output of oscillator 25 swings the potential of focus electrode 14 in only one direction away from an optimum focus voltage D.-C. level. Thus, the potential of focus electrode 14 swings from an optimum focus voltage level to some predetermined off-focus voltage and back during a cycle of the $f_1$ output of oscillator 25. It should be noted that an alternative mode of operation in which swings in either direction from the optimum focus voltage level are effected, i.e. where the potential of the focus electrode 14 swings from an optimum focus voltage level to a predetermined off-focus voltage in one direction, back to the optimum focus voltage level, to a second predetermined off-focus voltage in the other direction and back to an optimum focus voltage level in a cycle of the $f_1$ oscillator 25 output, is also feasible and will be subsequently discussed.

It will be appreciated that the effect of the application of the $f_1$ oscillations to the focus electrode 14 of the pickup device 11 is to provide a cyclic variation of the beam focus at the target 18 throughout the scanning of each raster line. The impinging beam rapidly alternates at the high frequency $f_1$ rate between appearances as a relatively small, sharply focused scanning spot and a relatively large, defocused scanning spot.

The output signal of pickup device 11, derived in the illustrative example from the monoscope pattern electrode 18 may thus be considered as a time multiplexed signal and may be expressed as comprising:

$$e_f(A_0+A_1\cos\omega_1t+A_2\cos 2\omega_1t+\ .\ .\ .)\\+e_d[B_0+B_1\cos(\omega_1t+180°)+B_2\cos(2\omega_1t+360°)+\ .\ .\ .]$$

where $e_f$ corresponds to the signal derived by the focused spot and $e_d$ corresponds to the signal derived by the defocused spot, and where the A's and B's are constants determined by the wave-shapes of the multiplexing process. It may be appreciated that if an output signal of the above character is passed through a low pass network having a cut-off frequency suitably below $f_1$, the resultant signal would be of the character $(e_fA_0+e_dB_0)$. It may also be appreciated that if the output signal of the cosine series characteristic set forth above is multiplied by a $\cos\omega_1t$ wave and subjected to comparable low pass filtering, a resultant signal in the nature of $$\left(e_f\frac{A_1}{2}-e_d\frac{B_1}{2}\right)$$

is obtained. With provision for suitable control of the relative amplitudes of the $(e_f+e_d)$ and $(e_f-e_d)$ signals, a signal of the character $(K_1e_f-K_2e_d)$ may be obtained by adding the signals together. It should be recognized the the signal $e_d$ derived by the defocused spot is equivalent to the sum of the focused spot signal $e_f$ and a signal $e_r$, which corresponds to the signal that would be derived by scanning the target with a ring concentric with and surrounding the focused spot. The signal $(K_1e_f-K_2e_d)$ may thus be expressed as being of the character $$(K_3e_f-K_4e_r)$$

Thus, performance of the operations suggested above on the output signal of pickup device 11 yields a signal corresponding to the signal derived by scanning the target with a normal sharply focused spot minus a signal derived by effectively scanning the target with a ring surrounding the sharply focused spot. A signal of this character is effectively aperture compensated in all directions, the amount or degree of aperture compensation attained being determined by the relative amplitudes of the focused spot signal and the ring signal effectively subtracted therefrom.

To derive an omnidirectionally aperture compensated signal from the output signal of pickup device 11 as indicated above, one arrangement which may be utilized is illustrated in Figure 1 as including a low pass filter 31 and a bandpass filter 33, each being connected to receive the output signal of pickup device 11. The low pass filter 31 passes a signal of the $(e_fA_0+e_dB_0)$ character, having a cut-off frequency generally corresponding to the maximum video frequency required of the video signalling system, e.g. 4.5 mc., and thus rejecting the series of harmonically related wobble frequency carriers and sideband frequencies thereof of any significant amplitude. The bandpass filter 33 is provided with a passband centered about the wobble frequency $f_1$, and the passband width may desirably correspond, for example, to twice the width of the passband of low pass filter 31, to accommodate a sufficient scope of upper and lower sidebands of the wobble frequency "carrier" as to correspond to the range of signal frequencies encompassed by the $(e_f+e_d)$ signal passing through the low pass channel. The output of bandpass filter 33

$$[e_fA_1\cos\omega_1t+e_dB_1\cos(\omega_1t+180°)]$$

is applied to a synchronous detector 35, wherein it is heterodyned with the output of the wobble frequency oscillator 25 ($\cos\omega_1t$). Suitable phase adjusting means 37 are included in the path of aplication of the $f_1$ output of oscillator 25 to detector 35 so as to permit achievement of proper phasing of the applied $f_1$ oscillator output with respect to the wobble frequency carrier applied via filter 33. The output of detector 35 is applied to a second low pass filter 38, having a cut-off frequency that is suitably below the wobble frequency $f_1$, and which may correspond to that of low pass filter 31. It may be appreciated from the previous discussion that the modulation product of the heterodyning action of detector 35 selectively passed by filter 38 will comprise a signal of $(e_f-e_d)$ form. The $(e_f-e_d)$ output of low pass filter 38 is combined with the $(e_f+e_d)$ output of filter 31 in a conventional adder 41. Suitable delay means 39 may be included in the path of application of the $(e_f+e_d)$ signal to adder 41, where required to equalize the delay thereof with respect to the delay suffered by the $(e_f-e_d)$ signal. By suitable control of the amplitudes of the respective $(e_f+e_d)$ and $(e_f-e_d)$ signals to be combined, via indicated gain controls 32 and 34 for the outputs of filters 31 and 33, for example, control may be effected of the factors designated $K_3$ and $K_4$ above. By thus controlling the effective relative amplitudes of the "ring" signal, and the focused spot signal, from which the former is effectively subtracted to provide the compensated signal output, the degree of omnidirectional aperture compensation attained may be adjusted as desired.

Figure 2:
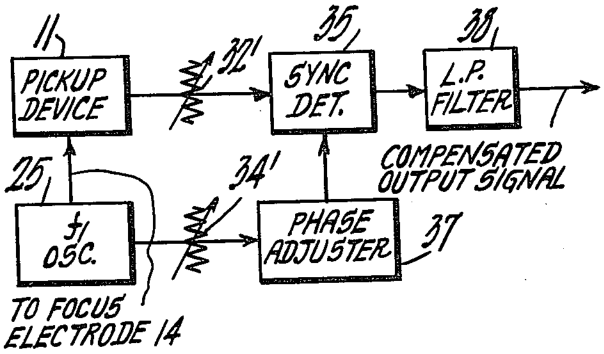

In Figure 2, apparatus for deriving omnidirectionally aperture compensated signals from the output of the pickup device 11 is illustrated in accordance with another embodiment of the present invention. It will be noted that in the arrangement of Figure 2, separate channels for the $(e_f+e_d)$ and $(e_f-e_d)$ signals are eliminated. It is assumed for the purposes of Figure 2, that the pickup device 11 is subject to the same mode of focus potential variation as is effected in the apparatus of Figure 1. The output signal of pickup device 11 derived by scanning its target with a focus wobbled beam, is applied to synchronous detector 35. The $f_1$ wobble frequency output of oscillator 25, suitably adjusted in phase in phase adjuster 37, is also applied to synchronous detector 35 to be heterodyned with the output signal of pickup device 11. Low pass filter 38, again having a cut-off frequency at the upper limit of the desired video signal frequency band (e.g. 4.5 mc.), selects the modulation products of the synchronous detection operation which in summation provides the desired aperture compensated signal. It will be appreciated from the discussion of the embodiment of Figure 1 that one modulation product selectively passed by low pass filter 38 comprises a wave of $$\left(e_f\frac{A_1}{2}-e_d\frac{B_1}{2}\right)$$

form. The time multiplexed pickup device output, as one of the input signals to the synchronous detector 35, also appears in the output thereof. The low pass filter 38 passes the $(e_fA_0+e_dB_0)$ portion of this input signal.

Thus the output of low pass filter 38 will comprise the sum of $$\left(e_f\frac{A_1}{2}-e_d\frac{B_1}{2}\right)$$

and $(e_fA_0+e_dB_0)$, which is a signal of the character $(K_1e_f-K_2e_d)$, or expressed in terms of the ring signal $e_r$ and the focused spot signal $e_f$, a signal of the character $(K_3e_f-K_4e_r)$.

In this embodiment, adjustment of the K's in the above expressions to control the degree of aperture compensation attained may be effected by controlling the relative amplitudes of the respective input signals to synchronous detector 35, as by the use of suitable gain controls 32' and 34' for the outputs of the pickup device 11 and oscillator 25, respectively.

Figure 3:
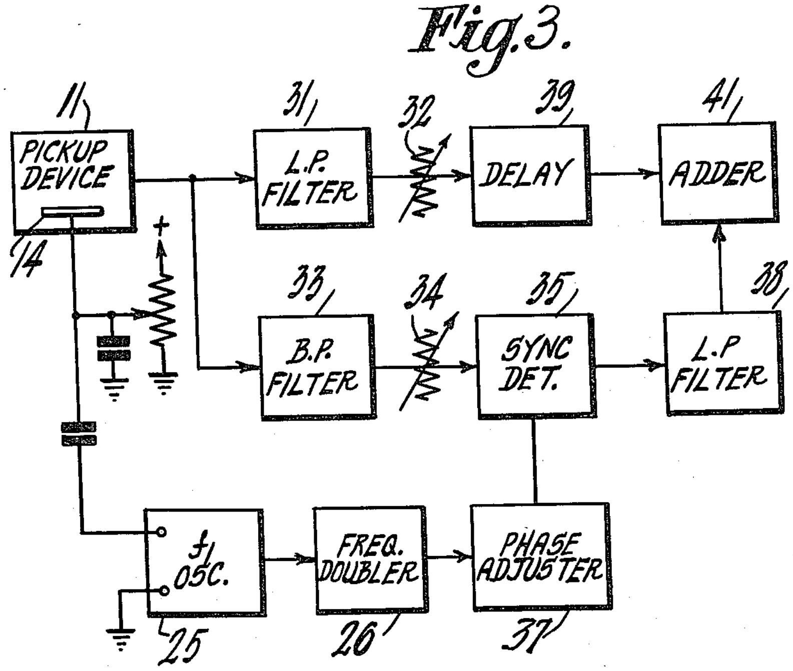

In Figure 3, omnidirectional aperture compensation apparatus in accordance with another form of the present invention is illustrated. It should be remembered that in the embodiments of the invention illustrated in Figures 1, 2 and 3, suitable means such as the clamping diode 17 are provided to insure that the periodic defocusing of the scanning beam of pickup device 11 is the result of changes in but one direction from the optimum focus potential on focus electrode 14. Thus, the "fundamental sampling" of both the focused spot signal and the defocused spot signal is at the wobble frequency $f_1$. It will be appreciated that if, in the absence of such clamping of the focus potential, the oscillations from source 25 are permitted to vary the focus voltage both above and below the optimum focus potential level, the "fundamental sampling" of both the focused spot signal and the defocused spot signal is at twice the wobble frequency rate, $2f_1$. Figure 3 is illustrative of the simple modification of the form of the invention illustrated in Figure 1 that would be required to obtain the desired omnidirectional aperture compensation with this mode of focus potential variation. A frequency doubler 26 is inserted in the path of application of oscillations from oscillator 25 to synchronous detector 35 so that a double wobble frequency heterodyning wave may be supplied to the latter. Similarly, a modification is required in the tuning of bandpass filter 33, so that the passband thereof is centered about $2f_1$ to permit selection of the double wobble frequency carrier and sidebands included in the output of the focus wobbled pickup device 11. In this case the respective input signals to synchronous detector 35 will be $[e_fA_1 \cos 2\omega_1t+e_dB_1 \cos (2\omega_1t+180°)]$ and $\cos 2\omega_1t$. However, the output selected by low pass filter 38 is again of the desired $(e_f-e_d)$ form. Low pass filter 31 again selects the $(e_fA_0+e_dB_0)$ video signal component for combination in adder 41 with the output of low pass filter 38.

From the foregoing, it will be appreciated that modifications of a similar type may be made to the embodiments of Figures 2 and 3 to accommodate the alternative form of focus potential variation. For the embodiment of Figure 2, such modification simply requires the insertion of a frequency doubler in the path coupling the output of oscillator 25 to synchronous detector 35. For the embodiment of Figure 3, such modification simply requires adjustment of the tuning of bandpass amplifier 133 to center its passband about the double wobble frequency $2f_1$.

Figure 4:
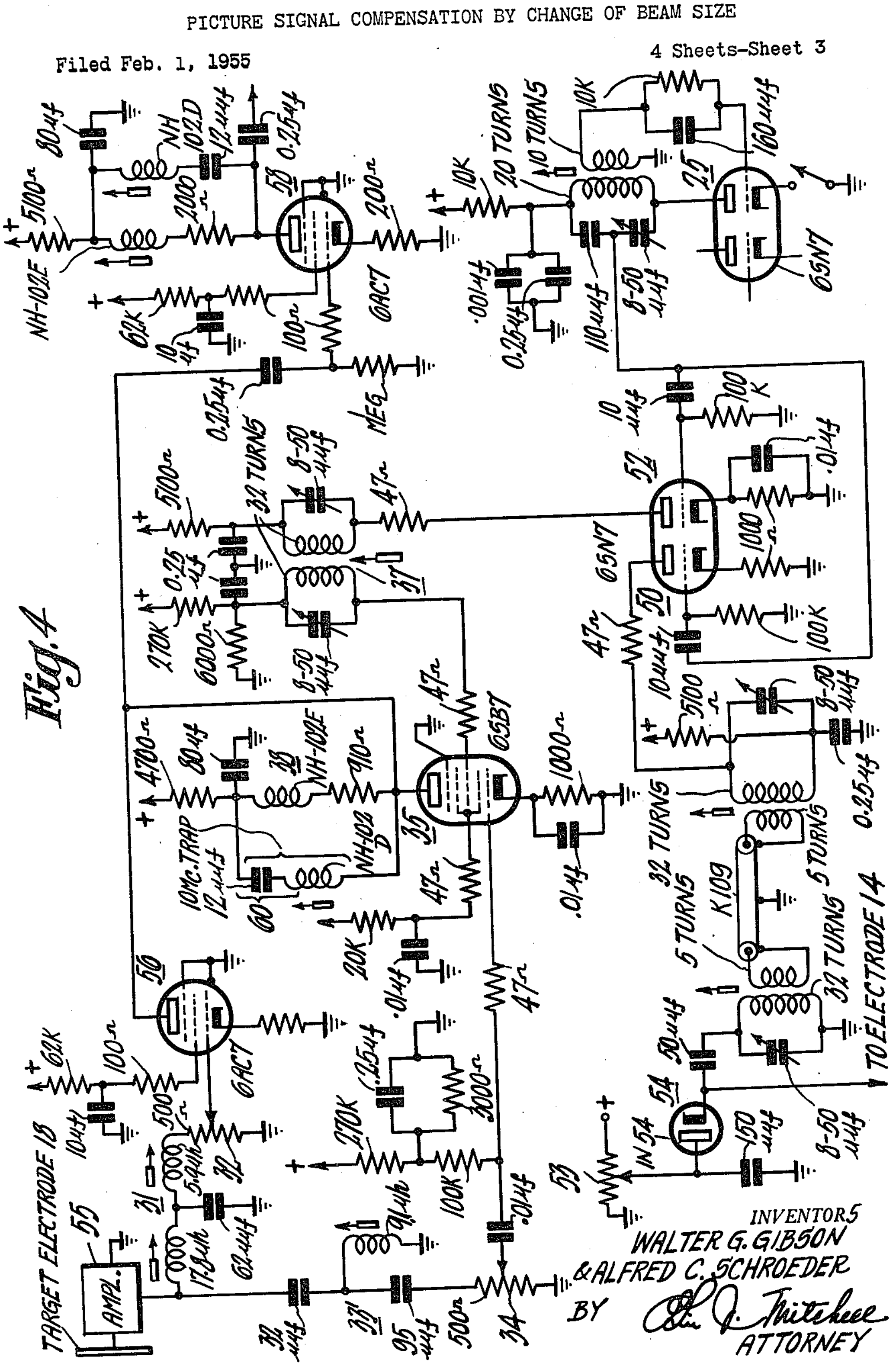
Figure 4 illustrates in schematic detail compensated video signal generating apparatus of the type illustrated generally in Figure 1.
Figure 5:
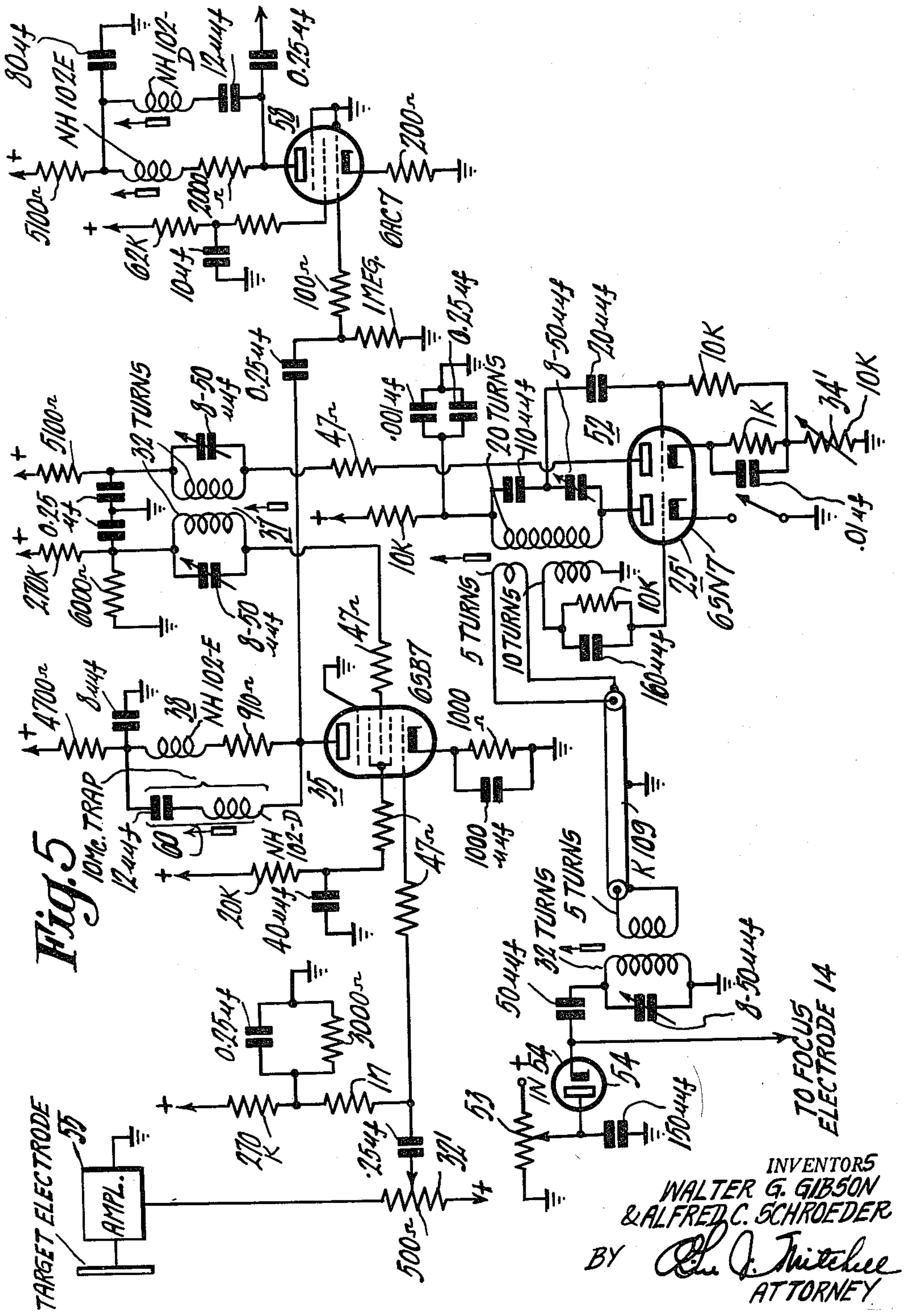
Figure 5 illustrates in schematic detail compensated video signal generating apparatus of the type illustrated generally in Figure 2.

It may be appreciated from the foregoing description that a variety of circuit arrangements may be utilized in carrying out the principles of the present invention relating to omnidirectional aperture compensation. Several embodiments have been disclosed in which separate channels are provided for derivation and amplitude control of the $(e_f+e_d)$ and $(e_f-e_d)$ signals to be combined; others have been disclosed in which such separate channels are not required. Several embodiments have been disclosed in which synchronous detection is employed in deriving the difference signal $(e_f-e_d)$, some of these involving heterodyning with wobble frequency waves and others involving heterodyning with double wobble frequency waves; other embodiments have been disclosed in which such synchronous detection is not required. It should be recognized that additional variations in circuit arrangement for deriving the aperture compensated signal from the focus wobbled pickup device output may be devised without departing from the scope of the present invention. In Figures 4 and 5 there are illustrated in schematic detail circuit arrangements of the general type illustrated in block form in Figures 1 and 2, respectively, but certain departures from, and augmentations of, the block representations will be noted in analyzing these circuits.

In Figure 4, an oscillator 25 is schematically illustrated as serving as the source of wobble frequency oscillations, at an illustrative wobble frequency $f_1$ of 10 mc. The output of oscillator 25 is applied to a pair of buffer amplifier stages 50 and 52, respectively. The output of amplifier 50 is applied via appropriate circuitry to the focus electrode 14 of the pickup device 11 (not illustrated in detail in this figure), to which electrode a unidirectional focus potential, derived from the focus voltage potentiometer 53, is also applied. It will be noted that the inclusion of a diode 54 in the connection of the focus pot tap to the focus electrode 14 insures that the wobble frequency oscillations vary the potential of the focus electrode 14 in but one direction away from the optimum focus range.

The wobble frequency oscillations appearing in the output of buffer amplifier 52 are applied via phase adjusting means 37 to the third grid of a pentagrid tube which serves as the synchronous detector 35. The output signal of pickup device 11, derived from the target electrode 18, is applied to an amplifying stage 55, which may, for example, comprise the first stage of a conventional broad band camera preamplifier. The output of amplifier 55 is applied via high pass filter 33' to the first grid of the pentagrid detector 35. With respect to the use of high pass filter 33' in the path of application of the pickup device output signal to the detector 35, it may be noted that a generally permissible alternative to the use at this point of a bandpass filter 33, as indicated in the block diagram of Figure 1, is the use of the high pass filter 33', having a cut-off frequency corresponding to the low frequency cut-off of the bandpass filter. In practical applications of the embodiment under discussion, the failure to eliminate the $2f_1$, $3f_1$, etc. carrier components from the pickup device output signal as applied to detector 35 should not appreciably disturb the previously indicated mode of operation.

The plate circuit of detector 35 is provided with a low pass filter 38 to attenuate modulation products falling outside the desired video range. It will, however, also be noted that, in the particular circuit illustrated, it is desirable to additionally particularly provide an $f_1$ trap in the detector 35 plate circuit (the LC combination 60 being series resonant at the 10 mc. wobble frequency), to attenuate the rather strong wobble frequency component appearing in the detector 35 output. The plate of detector 35 is tied to the plate of an amplifier 56, which receives at its input the pickup device 11 output signal components passed by low pass filter 31, to effect the desired addition $(e_f+e_d)$ and $(e_f-e_d)$ signals. The combined signals are applied to the input of an amplifier 58, the output electrode of which may be coupled to the grid of the second stage of the usual camera preamplifier. It will be noted that additional means for low pass filtering and $f_1$ trapping are provided in the plate circuit of amplifier 58.

The gain controls 32 and 34, which, as discussed with respect to Figure 1, provide control of the amount or degree of aperture compensation attained via control of the relative amplitudes of the $(e_f+e_d)$ and $(e_f-e_d)$ signals that in summation comprise the compensated output signal, take the form, in the schematic of Figure 5, of respective potentiometers across which the outputs of filters 31 and 33′ appear. The adjustable taps of potentiometers 32 and 34 are coupled to input electrodes of amplifier 56 and detector 35, respectively.

In Figure 5, apparatus is schematically illustrated corresponding generally to the form of the invention illustrated by the blocks of Figure 2. Oscillator 25 supplies wobble frequency $f_1$ oscillations to the focus electrode 14 as well as to a buffer amplifier 52′. The output of amplifier 52′ is applied via the phase adjusting means 37 to a grid of the detector 35. The output signal of pickup device 11, after amplification in stage 55, is applied to another grid of detector 35. Low pass filter 38 and $f_1$ trap 60 are again provided in the plate circuit of detector 35. The plate of detector 35 is coupled to the input electrode of the compensator output amplifier stage 58, which may again, as illustrated, be provided with further means for low pass filtering and $f_1$ trapping. The gain controls 32′ and 34′, which, as discussed with respect to Figure 2, control the degree of aperture compensation attained via control of the $(e_f+e_d)$ and $(e_f-e_d)$ signals summed in the compensator output, take the form of a potentiometer across the output of amplifying stage 55, and a variable resistance in the cathode circuit of amplifier 52′, respectively. It may be appreciated that in this arrangement, adjustment of potentiometer 32′ will have some effect on the amplitude of the $(e_f-e_d)$ component of the output of detector 35 as well as the $(e_f+e_d)$ component, whereas adjustment of control 34′ would have significant effect only upon the amplitude of the $(e_f-e_d)$ output component.

It should be noted that modification of the apparatus schematically illustrated in Figure 4 may be simply effected to permit the previously discussed alternative modification of focus potential variation whereby the potential on focus electrode 14 is permitted to swing in both directions from the normal focus potential level. Such modification may simply involve removal of the clamping diode 54 and substitution of a direct connection from the focus potentiometer 53 tap to the focus electrode 14; tuning of the coupled tuned circuits which comprise the phase adjusting means 37 to substatnially double the wobble frequency $f_1$ whereby the buffer amplifier 52 may effectively serve as the frequency doubler indicated by block 26 in Figure 3; and adjustment of high pass filter 33′ to cut-off at the edge of the desired lower sidebands of the double wobble frequency carrier. Similarly, modification of the apparatus schematically illustrated in Figure 5 will simply involve similar substitution of a direct connection for the clamping diode 54, and tuning of the phase adjuster 37 circuits to substantially double the wobble frequency whereby buffer amplifier 52′ serves as the required frequency doubler.

Figure 6:
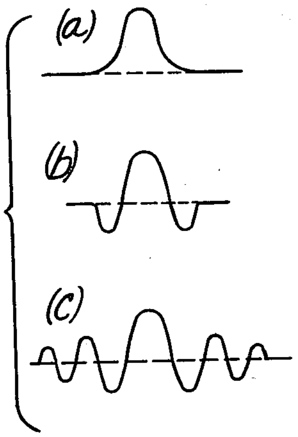
Figure 6 shows scanning spot energy distribution graphs of aid in explaining advantages of the foregoing and additional embodiments of the present invention.

It may be appropriate at this point to note that an effect of the indicated signal compensation in accordance with the various discussed forms of the invention is to provide an output signal which is a good approximation of that which would be obtained by scanning the pickup device target with a scanning spot having a $$\frac{\sin x}{x}$$

energy distribution (in all directions). Curve (a) of Figure 6 is illustrative of the energy distribution of the usual scanning spot. Curve (b) of Figure 6 illustrates the effective scanning spot energy distribution attained through practice of the present invention in accordance with the discussed embodiments of the invention. A more accurate approximation of a $$\frac{\sin x}{x}$$

spot distribution, such as indicated by curve (c) of Figure 6, may also be attained in accordance with principles of the present invention, through utilization of more complex contemplated embodiments. An effective spot distribution of the type indicated by curve (c) may be attained along the lines of the discussed embodiments by not only subtracting information from areas closely adjacent to the scanning spot center, but in addition adding, to a controlled degree, information from next adjacent areas, subtracting information from areas next adjacent to these areas, etc. One manner in which such operation may be effected, through modification of discussed embodiments, is to provide a plurality of the synchronous detectors 35, utilize respectively different phases of the oscillator 25 output in the respective heterodyning operations, and appropriately adjust the polarity and amplitude of the respective video output components so as to effectively obtain the respectively appropriate "positive" or "negative" response, when these components are added to the video component of the pickup device output signal.

Another manner in which such an effective spot distribution may be effected is to provide a plurality of the synchronous detectors 35 and respectively utilize the third, fifth, etc. harmonics of the wobble frequency $f_1$ as well as the fundamental in the heterodyning actions of respective ones of these detectors. Again, provision may be made for adjusting the amplitude and polarity of the respective detector outputs so as to effectively obtain the respectively appropriate negative or positive response, when these signals are added to the video component of the pickup device output signal.

Having thus described our invention, what is claimed is:

1. Apparatus comprising the combination of an image pickup device including means for scanning a subject image with a scanning spot having a certain effective aperture, and means for developing a video signal representative of said image in response to said scanning; means coupled to said image pickup device for periodically altering the focus of said scanning spot such that said developed video signal contains respective components representative of image scanning by a focused spot and representative of image scanning by a defocused spot; means coupled to said signal developing means and uninterruptedly coupled to said signal developing means responsive to said video signal for deriving therefrom an output signal representative of the difference between focused spot signal components and defocused spot signal components, and means for varying the amplitude of portions of said developed video signal whereby to reduce said effective aperture.

2. Video signal generating apparatus comprising the combination of an image scanning device including an electron beam source, an electron beam target, and beam deflection means for causing said electron beam to trace a scanning raster on said target; means coupled to said image scanning device for periodically altering the focus of said electron beam during the scanning of said raster; means for deriving an image informative signal from said image scanning device in response to the tracing of a scanning raster on said target by said electron beam of periodically changing focus; means coupled to said deriving means and including a low pass filter for selecting from said image informative signal a video signal component representative of a summation of video signals generated by scanning said target with said electron beam in focus and video signals generated by scanning said target with said electron beam out of focus; means coupled to said deriving means and to said beam deflection means and including a detector for obtaining from said image informative signal a video signal representative of the difference between video signals generated by scanning said target with said electron beam in focus and video signals generated by scanning said targt with said electron beam out of focus; and means coupled to said summation signal selecting means and to send difference signal obtaining means coupled to said video signal component selecting means and to said video signal obtaining means for adding said summation representative video signal component and said difference representative video signal to provide a compensated output signal.

3. Apparatus in accordance with claim 2 including means for adjusting the relative amplitudes of the summation representative video signal component and the difference-representative video signal added by said adding means.

4. Apparatus in accordance with claim 2 wherein said image scanning device includes a focus electrode, wherein said beam focus altering means comprises a source of oscillations of a predetermined frequency, and means for coupling said scanning device focus electrode to said source, and wherein said detector comprises a synchronous detector responsive to said image informative signal, and said apparatus also including means for effectively coupling said source to said synchronous detector.

5. Apparatus in accordance with claim 4 wherein said low pass filter has a cut-off frequency below said predetermined frequency, wherein said difference-representative signal obtaining means includes a bandpass filter having a passband which includes said predetermined frequency, and wherein said bandpass filter is coupled between said image scanning device and said synchronous detector whereby the image informative signal response of said synchronous detector is restricted to signal frequencies falling within said passband.

6. Apparatus in accordance with claim 4 wherein the means for effectively coupling said source to said synchronous detector includes a frequency doubler, and wherein said electron beam focus alternating means operates to alternate the focus of said electron beam in one direction only.

7. Apparatus comprising the combination of an image pickup tube including an electron beam source, a target structure, beam deflection means for providing deflection fields adapted to cause said electron beam to trace on said target a scanning raster comprising a series of parallel scanning lines, and means for controlling the focusing of said electron beam on said target, a source of high frequency oscillations, means for coupling said source to said focus controlling means whereby the focusing of said beam on said target is cyclically varied in only one direction at a rate corresponding to said high frequency, means for deriving an output signal from said pickup tube in response to the tracing of a scanning raster on said target as said beam focus in cyclically varied, a synchronous detector, means coupled to said deriving means for applying said pickup tube output signal to said synchronous detector, means for effectively coupling said source to said synchronous detector, said last named coupling means including means to adjust the phase of said oscillations from said source, and a low pass filter coupled to the output of said synchronous detector.

8. In an image scanning system of the type generating video signals by scanning a subject image with a scanning spot, the combination comprising means for modulating the focus of said scanning spot between a focussed and a defocussed condition at a predetermined frequency throughout the scanning of said image, means for heterodyning the signals generated by such scanning with reference signals that are in integral multiple of said predetermined frequency, said heterodyning means including means to adjust the phase of said reference signals, and frequency selective means coupled to the output of said heterodyning means for selectively passing a range of signal frequencies located below said predetermined frequency.

References Cited in the file of this patent

UNITED STATES PATENTS

| | | |
|---|---|---|
| 2,143,933 | Barthelemy | Jan. 17, 1939 |
| 2,222,934 | Blumlein | Nov. 26, 1940 |
| 2,691,696 | Yule | Oct. 12, 1954 |

FOREIGN PATENTS

| | | |
|---|---|---|
| 734,462 | Great Britain | Aug. 3, 1955 |